(12) United States Patent
Tang et al.

(10) Patent No.: US 7,616,739 B2
(45) Date of Patent: Nov. 10, 2009

(54) METHOD FOR FORWARDING MULTIMEDIA MESSAGES BETWEEN DIFFERENT MULTIMEDIA MESSAGING SERVICE CENTERS

(75) Inventors: Fei Tang, Shenzhen (CN); Xiaobin Li, Shenzhen (CN); Minghai Liu, Shenzhen (CN); Bo Zhang, Shenzhen (CN); Yong Meng, Shenzhen (CN); Weishu Yang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 754 days.

(21) Appl. No.: 11/127,759

(22) Filed: May 11, 2005

(65) Prior Publication Data

US 2005/0265525 A1 Dec. 1, 2005

Related U.S. Application Data

(63) Continuation of application No. PCT/CN03/000349, filed on May 14, 2003.

(30) Foreign Application Priority Data

Nov. 12, 2002 (CN) .................................. 02149290

(51) Int. Cl.
*H04M 11/00* (2006.01)
*H04M 1/64* (2006.01)
(52) U.S. Cl. .................................. 379/88.13; 379/88.22
(58) Field of Classification Search ............... 379/88.13
See application file for complete search history.

(56) References Cited

U.S. PATENT DOCUMENTS 5,497,373 A 3/1996 Hulen et al.

(Continued)

FOREIGN PATENT DOCUMENTS

| EP | 1085774 A2 | 3/2001 |
|---|---|---|
| EP | 1 255 416 A1 | 11/2002 |
| WO | WO 98/19438 | 5/1998 |
| WO | WO 98/19438 A1 | 5/1998 |

OTHER PUBLICATIONS

3rd Generation Partnership Project: Technical Specification Group; Telecommunication management; Charging management; Charging data description for application services; Release 5; 3GPP TS 32.235 vol. 5.0.0, (Sep. 2002), XP014009960.

(Continued)

*Primary Examiner*—Curtis Kuntz
*Assistant Examiner*—Joseph T Phan

(57) ABSTRACT

The invention discloses a method for forwarding multimedia messages (MMs) between different multimedia messaging service centers (MMSCs), comprising: a) an originator MMSC receiving a MM submitted by an originator terminal, then editing and generating a routing forward request message; b) the originator MMSC sending the routing forward request message generated in step a) to a recipient MMSC; c) the recipient MMSC returning a routing forward response message to the originator MMSC after receiving the routing forward request message; d) the recipient MMSC delivering the MM according to the MM related information contained in the routing forward request message; and e) the recipient MMSC generating a delivery report according to the current delivery status and sending it to the originator MMSC. With this invention, the problem is solved that the originator MMSC cannot exactly know whether the MM has been correctly delivered to the recipient terminal from the originator terminal under the condition the recipient terminal does not generate a delivery report in the process of MM forwarding.

1 Claim, 3 Drawing Sheets

U.S. PATENT DOCUMENTS

| | | | |
|---|---|---|---|
| 6,240,091 B1* | 5/2001 | Ginzboorg et al. | 370/401 |
| 6,282,274 B1* | 8/2001 | Jain et al. | 379/114.26 |
| 6,600,732 B1* | 7/2003 | Sevanto et al. | 370/349 |
| 6,865,262 B1* | 3/2005 | Mitts et al. | 379/114.02 |
| 7,058,165 B2* | 6/2006 | Koskinen et al. | 379/115.03 |
| 7,212,807 B2* | 5/2007 | Laumen et al. | 455/412.1 |
| 7,327,708 B2* | 2/2008 | Komandur et al. | 370/332 |
| 2001/0053687 A1* | 12/2001 | Sivula | 455/412 |
| 2002/0087549 A1* | 7/2002 | Mostafa | 707/10 |
| 2003/0193951 A1* | 10/2003 | Fenton et al. | 370/392 |
| 2005/0108417 A1* | 5/2005 | Haumont | 709/232 |
| 2005/0136832 A1* | 6/2005 | Spreizer | 455/3.02 |
| 2005/0198161 A1* | 9/2005 | Rooke et al. | 709/206 |
| 2005/0250520 A1* | 11/2005 | Johnson et al. | 455/466 |

OTHER PUBLICATIONS

3rd Generation Partnership Project: Technical Specification Group Terminals; Multimedia Messaging Service (MMS); Functional description; Stage 2; Release 5; 3GPP TS 23.140 vol. 5.4.0, (Sep. 2002), XP014007802.

European Search Report dated Aug. 11, 2006, for EP 03729804.9, in the name of Huawei Technologies Co., Ltd.

European Office action dated Oct. 19, 2007, for EP 03729804.9, in the name of Huawei Technologies Co., Ltd.

International Search Report of corresponding PCT/CN2003/000349, dated Aug. 28, 2003.

* cited by examiner

METHOD FOR FORWARDING MULTIMEDIA MESSAGES BETWEEN DIFFERENT MULTIMEDIA MESSAGING SERVICE CENTERS

CROSS-REFERENCE TO RELATED APPLICATIONS

This application is a Continuation Application of International Application Number PCT/CN2003/000349, filed on May 14, 2003, which claims priority of Chinese Patent Application Number 02149290.5, filed on Nov, 12, 2002.

FIELD OF THE TECHNOLOGY

The invention relates to message forwarding technique, particularly to a method for forwarding multimedia messages between different Multimedia Messaging Service Centers (MMSCs).

BACKGROUND OF THE INVENTION

In the time of the second-generation (2G) mobile communication, development of data service is limited because network bandwidth and the intrinsic disadvantages of Short Message Service (SMS) are difficult to overcome. As the development of the third-generation (3G) mobile communication system, various data services based on it have been developing rapidly and have a wider field than that based on the 2G mobile communication system.

Multimedia technology makes it possible for people to represent and transmit messages more accurately and emotionally. The 3G mobile communication system introduces multimedia technology into the mobile communication field. A new message service, Multimedia Message Service (MMS), will change the short message communication modes fundamentally. The MMS provides a non-real-time multimedia communication mode, and a user can send or receive a multimedia message consisting of texts, images, videos and audios. Based on this platform, richer services can be derived and better service quality can be provided.

An MMSC is responsible to send messages consisting of pure texts, pictures, videos, audios and other media over a network. The MMSC can provide three basic service capabilities: a point-to-point service capability, a point to application service capacity and an application to point service capacity, and also two extended service capacities: a point to multipoint service capacity and an application to multipoint service capacity.

MMSC is located on IP network, and connected to a wireless network through a Wireless Application Protocol (WAP) gateway. Implementation of MMSC is independent on the specific wireless networks. MMSC can support multiple networks such as GSM, GPRS, WCDMA, CDMA, CDMA2000 and the 3G networks in future.

The system structure of an MMSC is illustrated in FIG. 1, and the related system interfaces are determined by each network element. The definition and description of interfaces are concentrated on the standard procedure of service access. At the same time, a lowest requirement for the specification of the system physical interfaces is defined to ensure the variety of the system.

FIG. 1 illustrates the system structure of MMSC according to the prior art. The MMS terminal shown in FIG. 1 provides multimedia message services through an MMS user agent. The MMS user agent, which provides functions for user to browse, edit and process a multimedia message and operations for user to send, receive and delete a message, is an application in an MMS terminal, and is connected to the MMS relay/server which is also called MMSC through the reference point MM1. An MMSC makes protocol transforming, content adapting, storing and dispatching for multimedia messages, performs multimedia message transferring between different multimedia devices, and also produces a Charging Detail Record (CDR) for charging. An MMS user database which stores user information, personalized information and interface information etc. is connected to the MMSC through the reference point MM6. In a target network, the MMS user database is a part of MISC system and is integrated in the MMSC at present. An MMS value added service application for providing value added services is connected to the MMSC through the reference point MM7. A billing system for performing the charging operation of MMSC is connected to the MMSC through the reference point MM8. Peripheral devices, such as an email server, a Short Message Service Center (SMSC) and a facsimile etc, are connected to the MMSC through the reference point MM3 and provide external services.

As shown in FIG. 2, the reference point MM4 is an interface of different MMSCs and is used for transferring messages between different MMSCs through the Simple Mail Transfer Protocol (SMTP). The message transferring protocols needing to be satisfied when transferring multimedia messages over interface MM4 are mainly the protocols of the Third Generation Partnership Project (3GPP).

FIG. 3 is a message transaction flowchart of the MM4 interface. As shown in FIG. 3, forwarding multimedia messages between different MMSCs comprises the steps as follows.

a. After an originator MMSC has received the multimedia message (MM) submitted by an originator terminal and has successfully discovered a certain peer MMSC, the originator MMSC should forward the multimedia message to the recipient MMSC using the routing forward request message MM4_forward.REQ including control information of MMS and content of the MM. Correspondingly, the recipient MMSC should respond with a routing forward response message MM4_forward.RES including the status requested in the MM4_forward.RES. The definitions of the two messages concerning about this step are shown in Table 1.

TABLE 1

| Name of abstract message | Message type | Direction |
|---|---|---|
| MM4_forward.REQ | Request | Originator MMSC-> recipient MMSC |
| MM4_forward.RES | Response | Recipient MMSC->originator MMSC | b. After the recipient MMSC has delivered the MM, if the recipient terminal does not allow generating a delivery report, the recipient MMSC will not generate a delivery report; in the contrary, if the recipient terminal allows generating a delivery report, a delivery report MM4_delivery_report.REQ will be generated and sent to the originator MMSC. The delivery report only contains control information of MMS. The format of MM4_delivery_report.REQ specified in 3GPP is defined as shown in Table 2.

TABLE 2

| Information element | Presence | Description |
|---|---|---|
| 3GPP MMS Version | Mandatory | The MMS version of the originator MMS Relay/Server as defined by the present document. |
| Message Type | Mandatory | The type of message used on reference point MM4: "MM4_delivery_report.REQ". |
| Transaction ID | Mandatory | The identification of the MM4_delivery_report.REQ/MM4_delivery_report.RES pair. |
| Message ID | Mandatory | The identification of the original MM. |
| Recipient address | Mandatory | The address of the MM recipient of the original MM. |
| Originator address | Mandatory | The address of MM originator of the original MM. |
| Date and time | Mandatory | The time and date when the MM was handled, i.e. searched, time overridden and rejected. |
| Acknowledgement Request | Optional | A request for MM4_delivery_report.RES |
| MM state | Mandatory | The state of MM, such as the MM has been searched, time overridden and rejected. |
| MM state text | Optional | The corresponding text of MM state. | c. If having received a delivery report from the recipient MMSC, the originator MMSC responds a delivery report response message MM4_delivery_report.RES providing status information of the condition requested by the MM4_delivery-report.REQ. It is necessary for MMSC to support the MM4_delivery-report.REQ. The definitions of two messages of delivery report are shown in Table 3.

TABLE 3

| Name of abstract Message | Type | Direction |
|---|---|---|
| MM4_delivery_report.REQ | Request | Recipient MMSC –> originator MMSC |
| MM4_delivery_report.RES | Response | Originator MMSC –> recipient MMSC |

In the above sending flow of the MM4 interface message, the MM4_forward.REQ, MM4_forward.RES, MM4_delivery_report.REQ and MM4_delivery_report.RES are protocol messages of MM4 interface, the other messages are for other reference points, which can be supplement of the above flow.

With the above-mentioned steps and the prior message transmission protocol structure, forwarding MMs between different MMSCs can be implemented.

Nevertheless, though the function of forwarding MMs between different MMSCs in the message sending process can be realized with the prior message transmission protocol structure, if the following situation happens, the corresponding functions cannot be realized with the prior message transmission protocol structure.

When an MM is being forwarded between different MMSCs, according to the 3GPP protocols, if the recipient terminal does not allow generating a delivery report, the recipient terminal shall not send a delivery report to the originator terminal even the originator terminal required so. According to the prior MM forwarding process, in this case the recipient terminal does not generate a delivery report, the originator MMSC can only depend on the MM4_forward.RES to determine whether the MM forwarding is successful, and cannot know exactly whether or not the MM is delivered correctly to the recipient terminal from the originator terminal.

SUMMARY OF THE INVENTION

An object of the invention is to provide a method for forwarding MMs between different MMSCs. With this method, the originator MMSC is capable of exactly knowing whether the MM has been successfully delivered from the originator terminal to the recipient terminal.

In order to achieve this object, a method for forwarding MMs between different MMSCs comprises:

a) an originator MMSC receiving an MM submitted by an originator terminal, then editing and generating a routing forward request message;

b) the originator MMSC sending the routing forward request message generated in step a) to a recipient MMSC;

c) the recipient MMSC returning a routing forward response message to the originator MMSC after receiving the routing forward request message;

d) the recipient MMSC delivering the MM according to the MM related information contained in the routing forward request message; and e) the recipient MMSC generating a delivery report according to the current delivery status and sending it to the originator MMSC.

In this method, the delivery report mentioned in step e) may further contain a filed showing whether the recipient terminal for the MM allows generating a delivery report.

The method may further comprise:

f) the originator MMSC determining whether to generate a delivery report to be sent to the originator terminal according to the field showing whether the recipient terminal allows generating a delivery report and the information showing whether the originator terminal requires obtaining a delivery report contained in said delivery report mentioned in step e) after receiving said delivery report from the recipient MMSC.

The method also may further comprise:

g) determining whether the originator MMSC has generated the delivery report to be sent to the originator terminal, if so, sending the delivery report to be sent to the originator terminal to the originator terminal for the current MM; otherwise not performing any further processing.

With this invention, no matter whether the recipient terminal allows generating a delivery report or not, the recipient MMSC will send a delivery report to the originator MMSC to show the delivery status of the MM. Meanwhile, an extended field is added in the delivery report to show whether the recipient terminal allows generating a delivery report. The originator MMSC determines whether to generate a delivery report and send it to the originator terminal for the current MM according to the received delivery report and whether the originator terminal requires a delivery report. Therefore, the invention solves the problem that the originator MMSC can only confirm whether the MM forwarding is successful or not based on the routing forward response message and cannot exactly know whether the MM is correctly delivered to the recipient terminal from the originator terminal under the condition the recipient terminal does not generate a delivery report.

In practice, for example in the process of forwarding charging information, the method can further solve the problem that the originator terminal is charged when the MM submitted by it is not delivered to the recipient terminal because the recipient terminal does not generate a delivery report.

DETAILED DESCRIPTION OF THE INVENTION

The invention will be described in more detail with reference to drawings and an embodiment.

The basic ideal of this invention is that during forwarding an MM between different MMSCs, the recipient MMSC will generate a delivery report showing the MM delivery status and send it to the originator MMSC no matter whether the recipient terminal allows generating a delivery report or not. In this way, the problem that the originator cannot exactly obtain the information whether the MM has been delivered from the originator terminal to the recipient terminal has been solved.

In another Chinese patent application of this applicant, a method for implementing message forwarding between different MMSCs and charging has been proposed. In the method, the MM4_forward.REQ message has been extended to contain five more fields: Value Added Service Provider (VASP) service application code, serving code, service code, charging type and charging ratio. Since the five fields represent the current VAP application, the current service and the accurate charging information, the problem that the charging function cannot be realized when forwarding MMs between different MMSCs has been resolved.

A specific implementing process according to this invention will be described beads on an embodiment taking forwarding charging information as an example.

Figure 1:
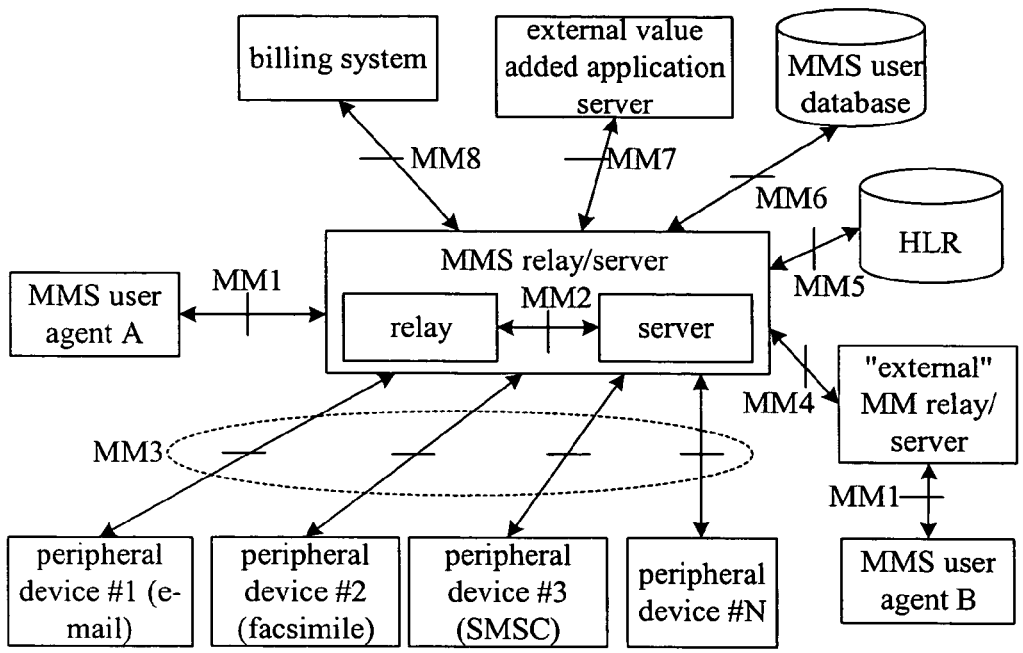
FIG. 1 is a schematic diagram illustrating system architecture of MMSC.
Figure 2:
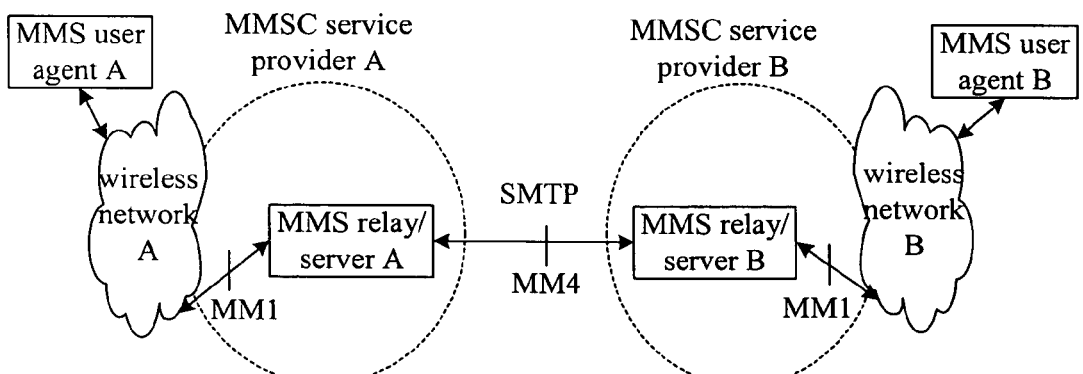
FIG. 2 is a schematic diagram illustrating interfaces between different MMSCs.
Figure 3:
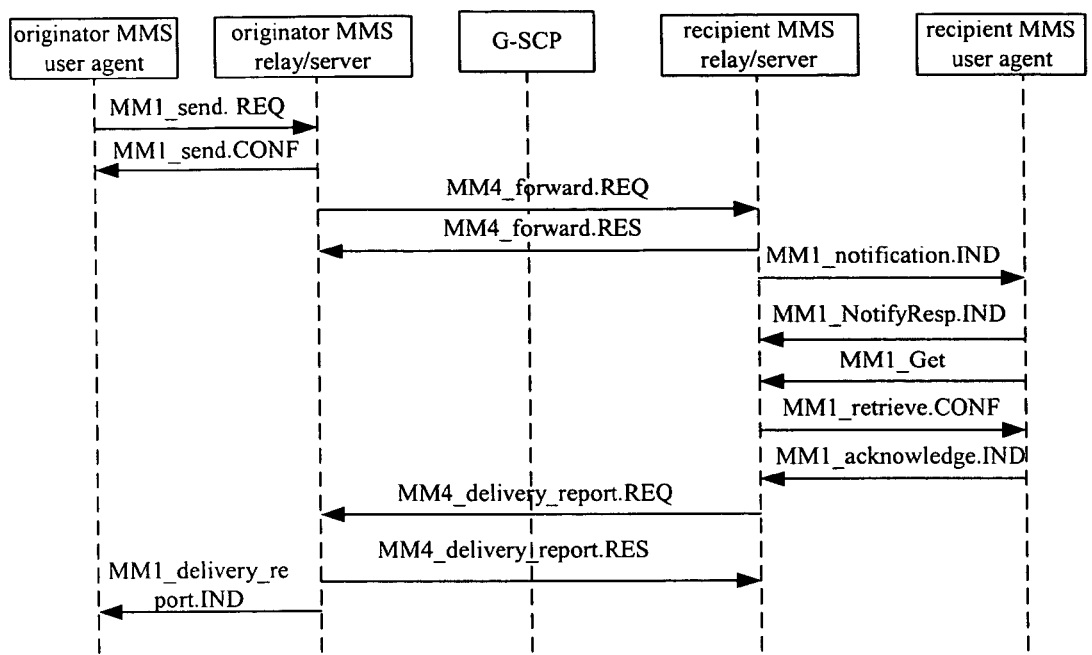
FIG. 3 is a flow chart illustrating a message transaction flow according to the MM4 interface protocol.

The network environment used in this embodiment is the same as that shown in FIG. 2. As shown, the MMS relay/server A is the so-called MMSC. First, an originator terminal submits an MM to an originator MMSC which forwards the MM to a recipient MMSC through the MM4 interface based on the SMTP protocol. The recipient MMSC delivers the MM to the recipient terminal and returns a delivery report to the originator MMSC to inform the originator MMSC the delivery status of the current MM.

Figure 4:
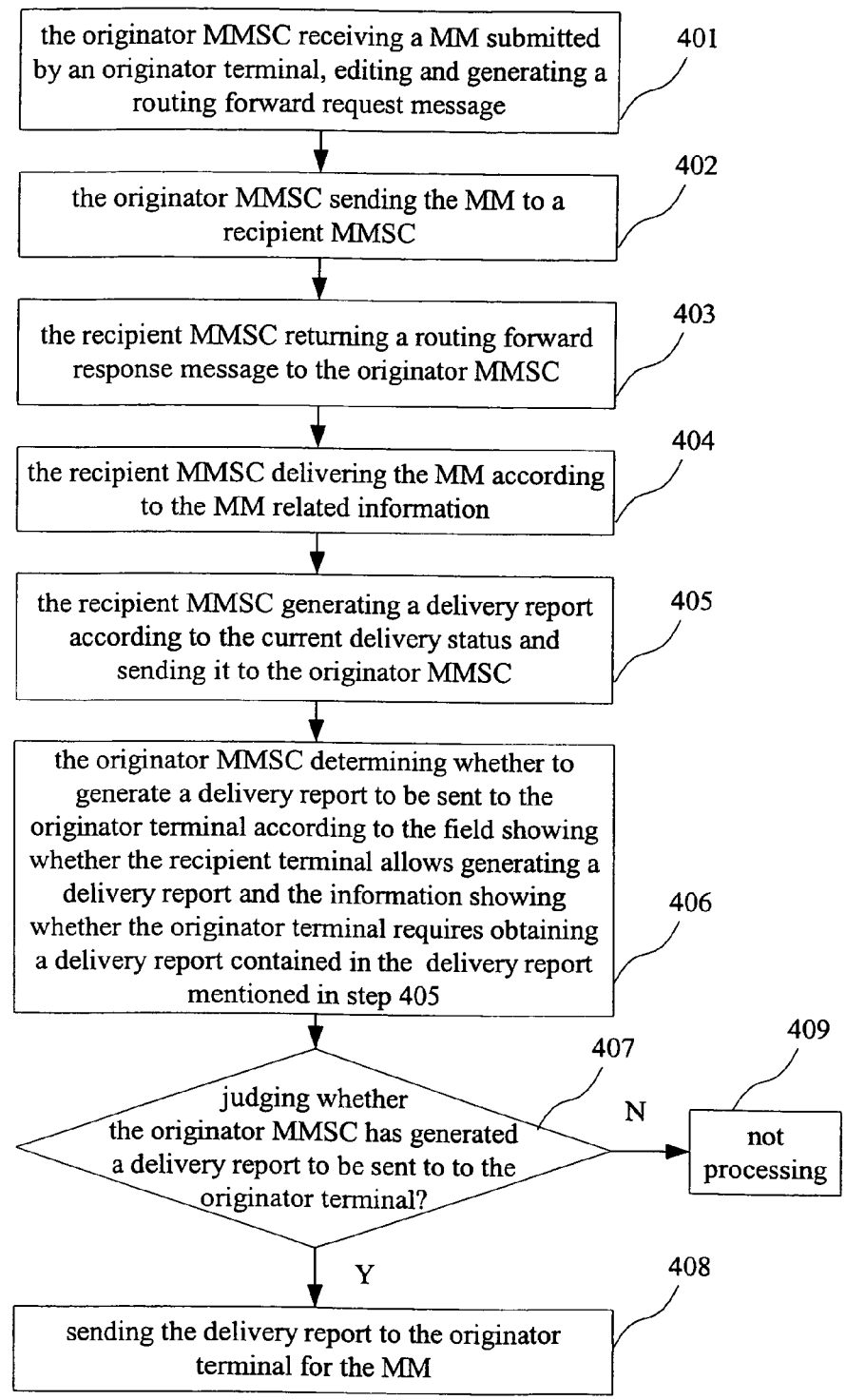
FIG. 4 is a flow chart illustrating the flow of forwarding MM according to the present invention.

As shown in FIG. 4, the process of forwarding an MM comprises the following steps.

In step 401, after receiving an MM submitted by the originator terminal, the originator MMSC edits and generates a routing forward request message MM4_forward.REQ containing information for identifying the MM. Here, the editing process means to generate a message with standard format specified by protocols.

In this embodiment, in order to implement charging function while forwarding an MM between different MMSCs, the originator MMSC edits and generates MM4_forward.REQ containing charging information after receiving the current submitted MM.

In step 402, the originator MMSC sends the MM4_forward.REQ generated in step 401 to the recipient MMSC.

In step 403, the recipient MMSC returns a routing forward response message MM4_forward.RES to the originator MMSC. In other words, after receiving the MM4_forward.REQ sent by the originator MMSC, the recipient MMSC returns MM4_forward.RES as response to the current receiving status to the originator MMSC.

In step 404, the recipient MMSC delivers the MM according to the related information contained in the MM4_forward.REQ.

In step 405, the recipient MMSC generates a delivery report MM4_delivery_report.REQ based on the current delivery status and returns it to the originator MMSC.

After having delivered the MM, the recipient MMSC generates a corresponding MM4_delivery_report.REQ based on the current delivery status of the MM and sends it to the originator MMSC of the MM, whereby notifying the originator MMSC of the information that the current MM delivery status is either success or failure, which assures that the originator MMSC implements the MM forwarding process and charging function based on the charging information contained in the MM4_forward.REQ message and thus the fees for the originator terminal can be collected.

In the prior art, after delivering the MM, the recipient MMSC will determine whether to generate MM4_delivery_report.REQ showing the delivery status of the MM and send it to the originator MMSC according to the fact whether the recipient terminal allows generating the MM4_delivery_report.REQ. Under the condition that the recipient terminal does not allow so, the originator MMSC cannot receive the MM4_delivery_report.REQ showing the delivery status of the MM, thus it only can confirm whether the MM forwarding is either successful or failed based on the MM4_forward.RES which it can receive in any event, but cannot exactly know whether the MM has been delivered from the originator terminal to the recipient terminal correctly. Moreover, since the recipient terminal does not allow generating MM4_delivery_report.REQ, it is possible for the recipient MMSC not to send the delivery report to the originator MMSC, thus the originator MMSC can charge the originator terminal only according to the fact extracted from the MM4_forward.RES whether the MM forwarding is either successful or not, but according to the fact whether the MM has been delivered successfully. In this way, the problem may appear that the originator terminal will be charged even when the MM submitted by the originator terminal is not delivered to the recipient terminal successfully. In this embodiment, after delivering an MM, the recipient MMSC generates MM4_delivery_report.REQ showing the delivery status of the MM and sends it to the originator MMSC no matter the recipient terminal allows or not, so the originator MMSC can exactly know the delivery state of the MM and perform correct charging.

After receiving the MM4_delivery_report.REQ, the originator MMSC generates a new delivery report according to the status information from the received MM4_delivery_report.REQ and the requirements of the originator terminal and sends it to the originator terminal, informing the user about delivery status of the submitted MM.

In order to determine whether to send a new delivery report to the originator terminal, a field showing whether the recipient allows generating a delivery report is added in the MM4_delivery_report.REQ with this invention. This extended field is shown in Table 4.

TABLE 4

| Information element | Presence | Description |
| --- | --- | --- |
| Recipient terminal allowing generating a delivery report | Mandatory | Showing whether the recipient terminal allows generating a delivery report or not after extracting MM |

In step 406, after receiving the MM4_delivery_report.REQ, the originator MMSC determines whether to generate a delivery report and send it to the originator terminal according to the extended field shown in Table 4 and the field showing whether the originator terminal requires MM4_delivery_report.REQ.

If the recipient terminal does not allow generating a delivery report, the originator MMSC does not generate a delivery report for the originator terminal no matter whether the originator terminal requires obtaining MM4_delivery_report.REQ or not. If the recipient terminal allows generating a delivery report while the originator terminal does not require MM4_delivery_report.REQ, the originator MMSC does not generate a delivery report also. Only when the recipient terminal allows generating a delivery report and the originator terminal requires MM4_delivery_report.REQ, the originator MMSC generates a delivery report to be sent to the originator terminal. The new delivery report sent to the originator terminal has discrepancy with the MM4_delivery_report.REQ sent from the recipient MMSC to the originator MMSC, but it is generated based on the MM4_delivery_report.REQ. The further detailed description about the above-mentioned conditions will be omitted for they are not the key points of the invention.

In step 407, whether the originator MMSC generates a delivery report and sends it to the originator terminal will be determined. If so, the originator MMSC will send the delivery report to the originator terminal for the current MM in step 408, otherwise no any further process will be performed in step 409.

In this invention, no matter whether the recipient terminal allows generating MM4_delivery_report.REQ, the recipient MMSC sends MM4_delivery_report.REQ showing the delivery status of the current MM to the originator MMSC. Meanwhile, an extended information element showing whether the recipient allows generating MM4_delivery_report.REQ is added in the original delivery report of the MM4 interface. The originator MMSC decides whether to generate a delivery report and send it to the originator terminal of the current MM according to the received delivery report and the fact whether the originator terminal requires MM4_delivery_report.REQ. If having generated a delivery report, the originator MMSC will send it to the originator terminal of the current MM. Therefore, with the invention, the problem the originator MMSC can only confirm whether the MM forwarding is successful based on the MM4_forward.RES and cannot exactly know whether the MM is correctly delivered to the recipient terminal from the originator terminal if the recipient terminal does not allow generating MM4_delivery_report.REQ during the prior MM forwarding process can be resolved. At the same time, the invention also can solve the problem the originator terminal is charged under the condition the MM submitted by the originator terminal is not delivered to the recipient terminal.

The forgoing embodiment is merely exemplary and is not to be construed as limiting the present invention. The description of the present invention is intended to be illustrative, and not to limit the scope of the claims. Many alternatives, modifications, and variations will be apparent to those skilled in the art.

The invention claimed is:

1. A method for forwarding Multimedia Messages (MMs) between different Multimedia Messaging Service Centers (MMSCs), comprising:
   a) an originator MMSC receiving an MM submitted by an originator terminal, then generating a routing forward request message;
   b) the originator MMSC sending the routing forward request message generated in step a) to a recipient MMSC;
   c) the recipient MMSC returning a routing forward response message to the originator MMSC after receiving the routing forward request message;
   d) the recipient MMSC delivering the MM according to an MM related information contained in the routing forward request message;
   e) the recipient MMSC generating a first delivery report according to the current delivery status and sending the first delivery report to the originator MMSC, wherein the first delivery report mentioned in step e) further contains a field showing whether a recipient terminal for the MM allows generating a delivery report;
   f) after receiving said first delivery report from the recipient MMSC, the originator MMSC determining whether to generate a second delivery report to be sent to the originator terminal according to the field showing whether the recipient terminal allows generating a delivery report and the information showing whether the originator terminal requires obtaining a delivery report contained in said second delivery report; and
   g) determining whether the originator MMSC has generated the second delivery report to be sent to the originator terminal, if so, sending the second delivery report to the originator terminal for the current MM; otherwise not performing any further processing.

* * * * *

UNITED STATES PATENT AND TRADEMARK OFFICE
CERTIFICATE OF CORRECTION

| | | |
|---|---|---|
| PATENT NO. | : 7,616,739 B2 | Page 1 of 1 |
| APPLICATION NO. | : 11/127759 | |
| DATED | : November 10, 2009 | |
| INVENTOR(S) | : Tang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1213 days.

Signed and Sealed this

Nineteenth Day of October, 2010

David J. Kappos
*Director of the United States Patent and Trademark Office*